US012613192B2

(12) United States Patent
Yune et al.

(10) Patent No.: US 12,613,192 B2
(45) Date of Patent: Apr. 28, 2026

(54) LASER INDUCED BREAKDOWN SPECTROSCOPE ANALYZING AEROSOL

(71) Applicant: SDT Inc., Seoul (KR)

(72) Inventors: Jiwon Yune, Gwacheon-si (KR); Jeaha Yoo, Seoul (KR); Junseok Yang, Seoul (KR)

(73) Assignee: SDT INC., Seoul (KR)

( * ) Notice: Subject to any disclaimer, the term of this patent is extended or adjusted under 35 U.S.C. 154(b) by 133 days.

(21) Appl. No.: 18/627,740

(22) Filed: Apr. 5, 2024

(65) Prior Publication Data

US 2024/0337600 A1    Oct. 10, 2024

(30) Foreign Application Priority Data

Apr. 7, 2023    (KR) ........................ 10-2023-0046104
Apr. 7, 2023    (KR) ........................ 10-2023-0046105

(51) Int. Cl.
*G01N 21/71*    (2006.01)
(52) U.S. Cl.
CPC .................................. *G01N 21/718* (2013.01)
(58) Field of Classification Search
CPC ....... G01J 3/0291; G01J 3/443; G01N 21/718
See application file for complete search history.

(56) References Cited

U.S. PATENT DOCUMENTS

| | | | | |
|---|---|---|---|---|
| 4,443,072 A * | 4/1984 | Ballard | .................. | G02B 7/007 |
| | | | | 356/318 |
| 2003/0199649 A1* | 10/2003 | Orbison | ............... | G01N 21/359 |
| | | | | 526/123.1 |
| 2004/0056197 A1* | 3/2004 | Davidson | ............. | G01N 21/359 |
| | | | | 250/339.1 |
| 2008/0190557 A1* | 8/2008 | Shekel | ............... | G01N 21/3577 |
| | | | | 156/345.15 |
| 2013/0100444 A1* | 4/2013 | Chesner | .................. | G01J 3/443 |
| | | | | 356/318 |
| 2016/0116416 A1* | 4/2016 | Wang | ................... | G01N 21/718 |
| | | | | 356/318 |
| 2024/0085337 A1* | 3/2024 | Day | ........................ | G01N 21/31 |

* cited by examiner

*Primary Examiner* — Hina F Ayub
(74) *Attorney, Agent, or Firm* — Birch, Stewart, Kolasch & Birch, LLP

(57)    ABSTRACT

An LIBS module includes a cover having a first optical channel through which a laser beam passes and a second optical channel through which plasma emission light passes therein; a first optical system placed in the first optical channel; and a second optical system placed in the second optical channel. A clamp with a coupling hole through which a predetermined pipe may pass is formed in the cover, and the coupling hole is placed in a region where an extension path of the first optical channel and an extension path of the second optical channel cross. The clamp includes a first clamp branch and a second clamp branch, and while a first segment of the pipe is coupled to the coupling hole, the first clamp branch and the second clamp branch are tightened to each other to couple the pipe and the LIBS module to each other.

12 Claims, 7 Drawing Sheets

[FIG. 1]
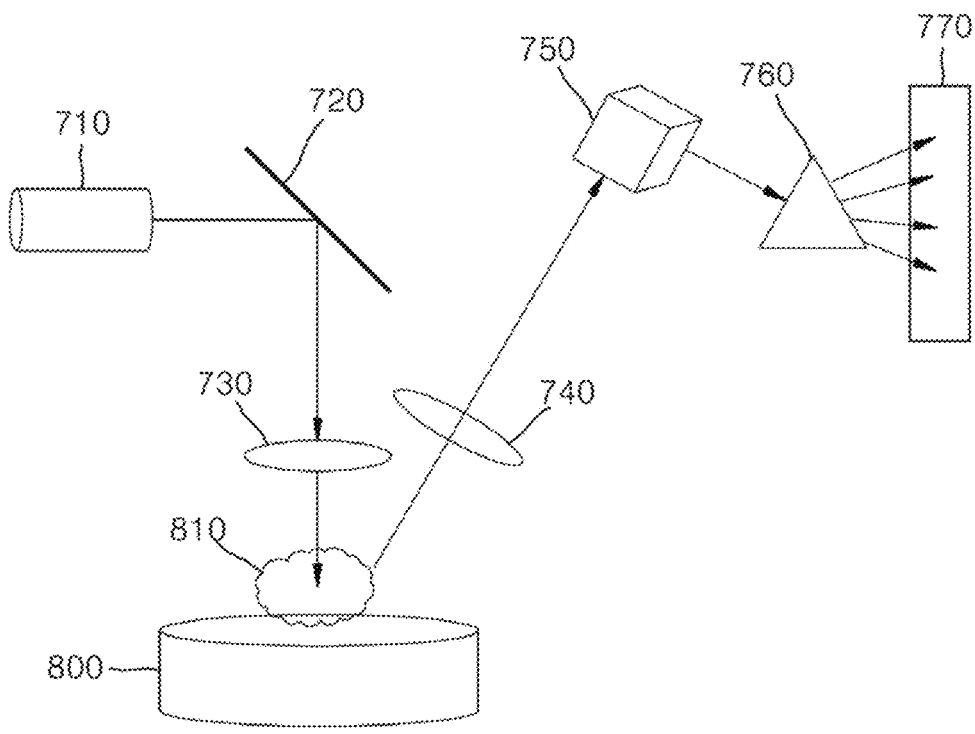

[FIG. 2]
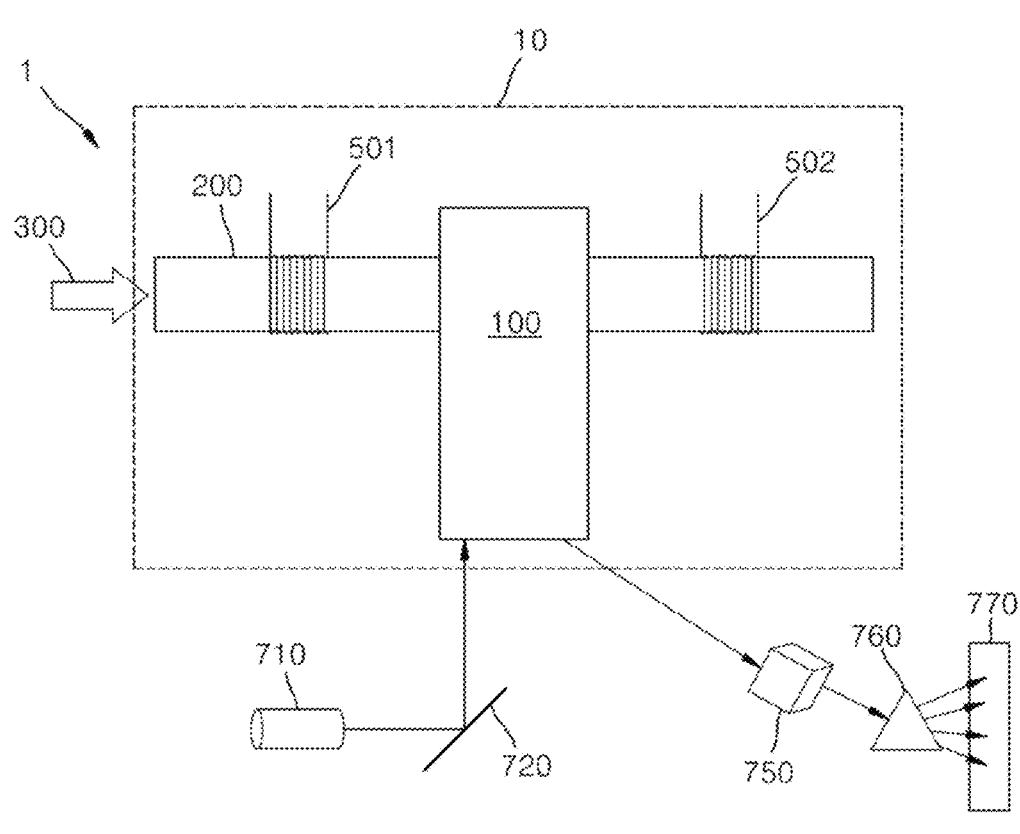
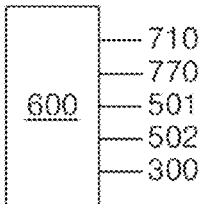

[FIG. 3]
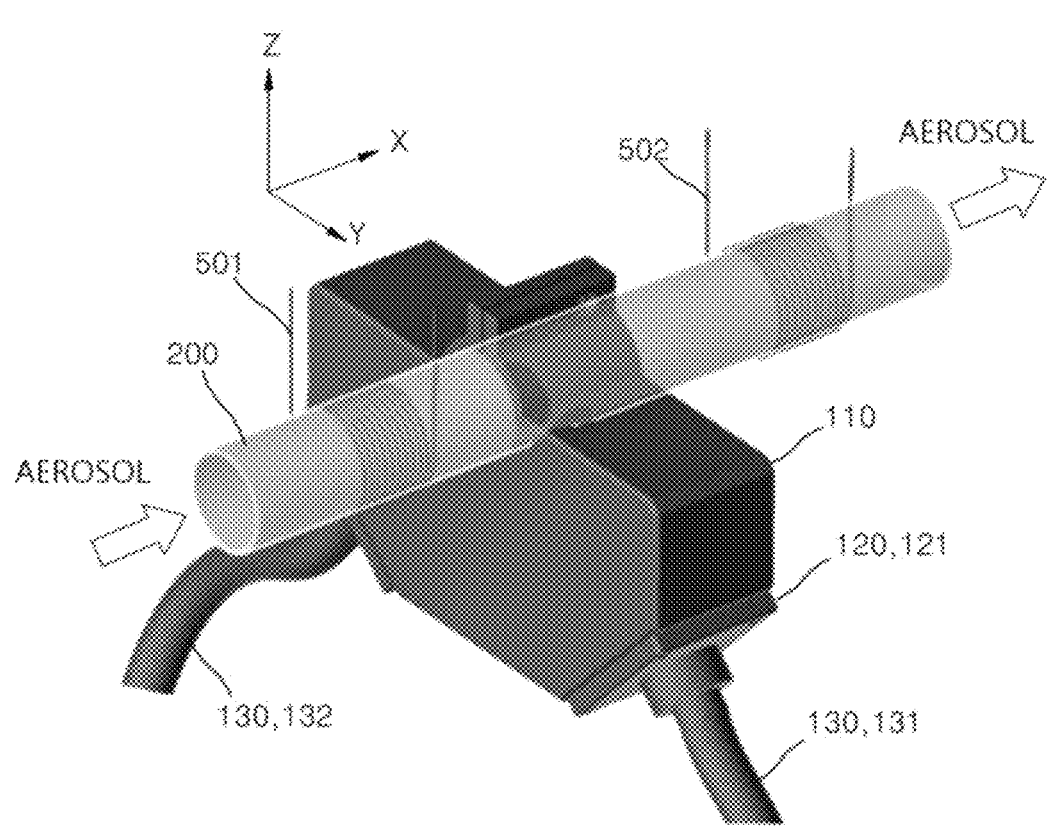

[FIG. 4A]
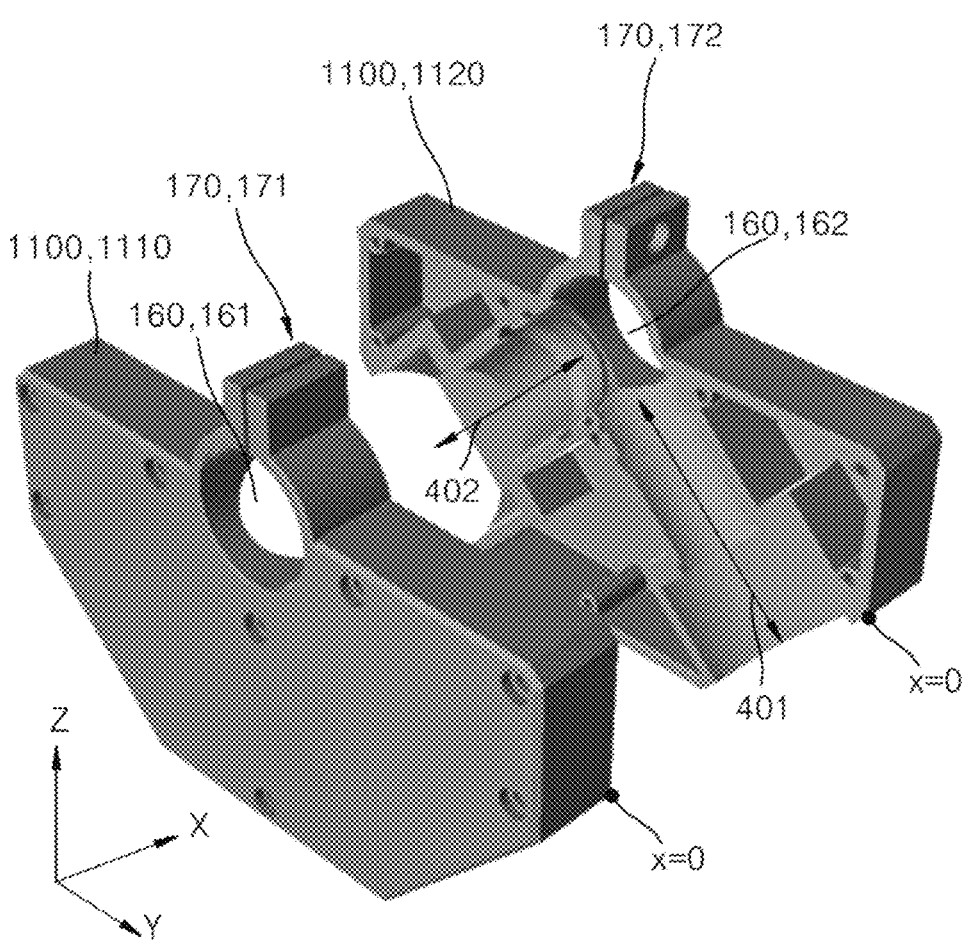

[FIG. 4B]
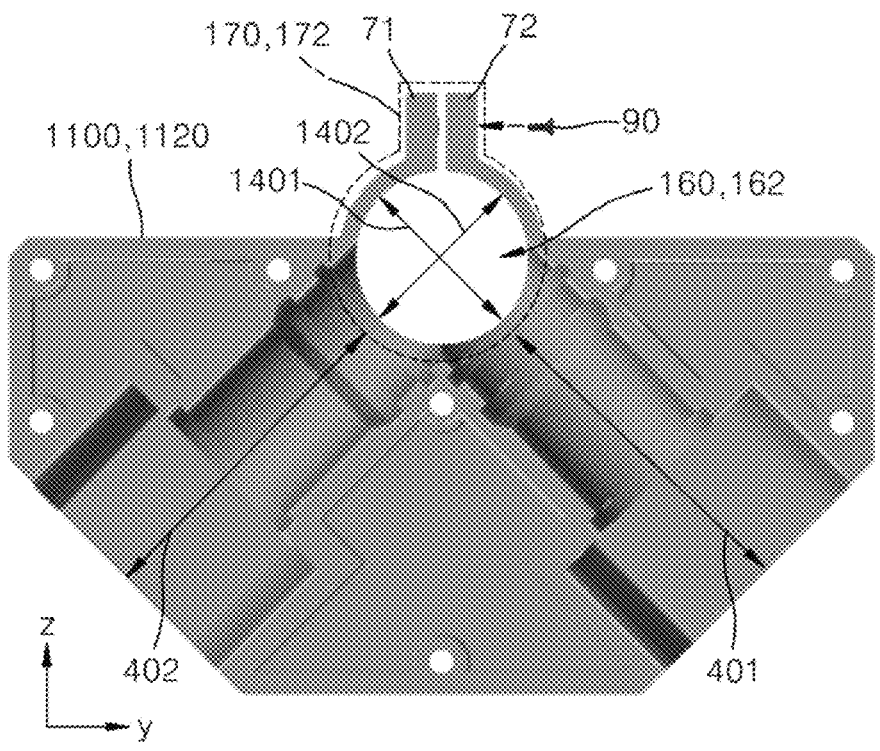
[FIG. 4C]
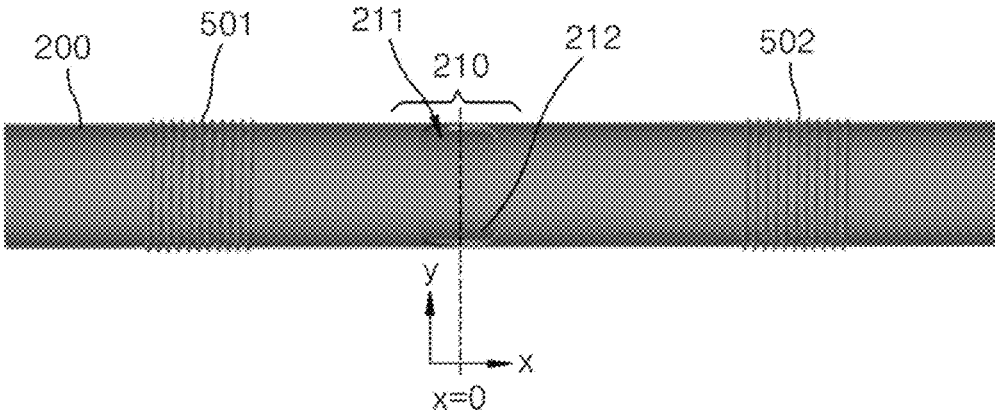

[FIG. 5]
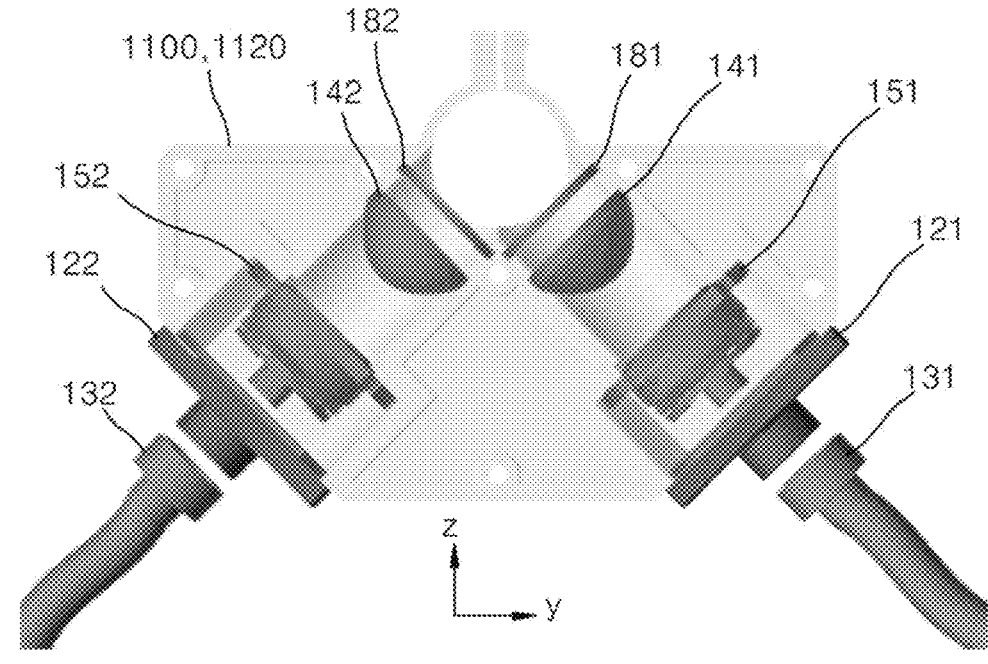
[FIG. 6]
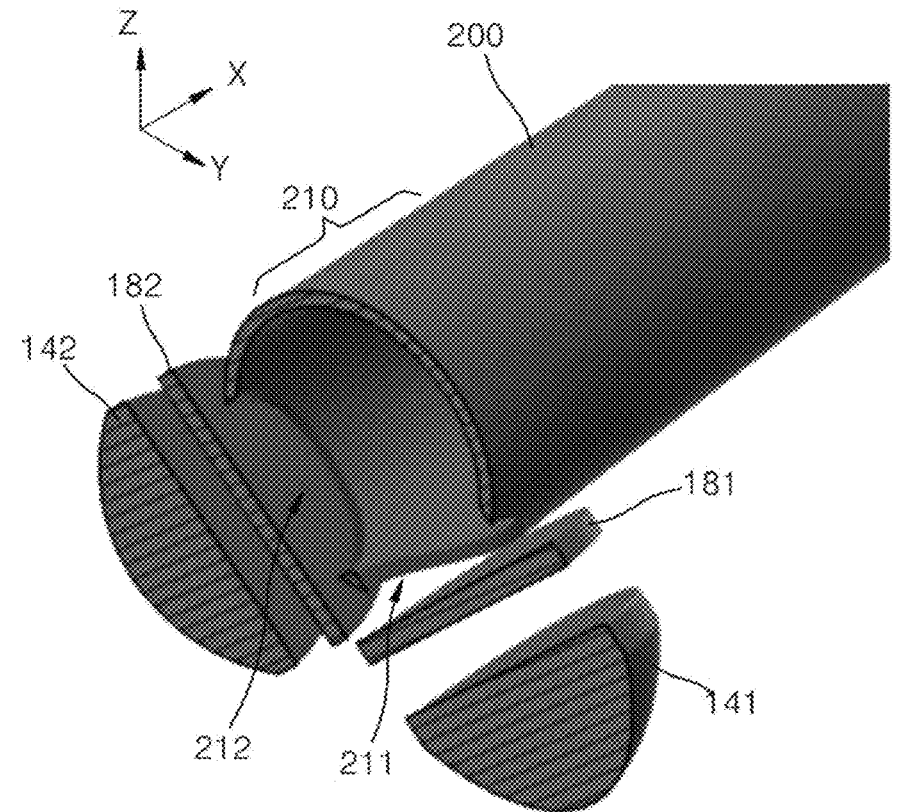

[FIG. 7]
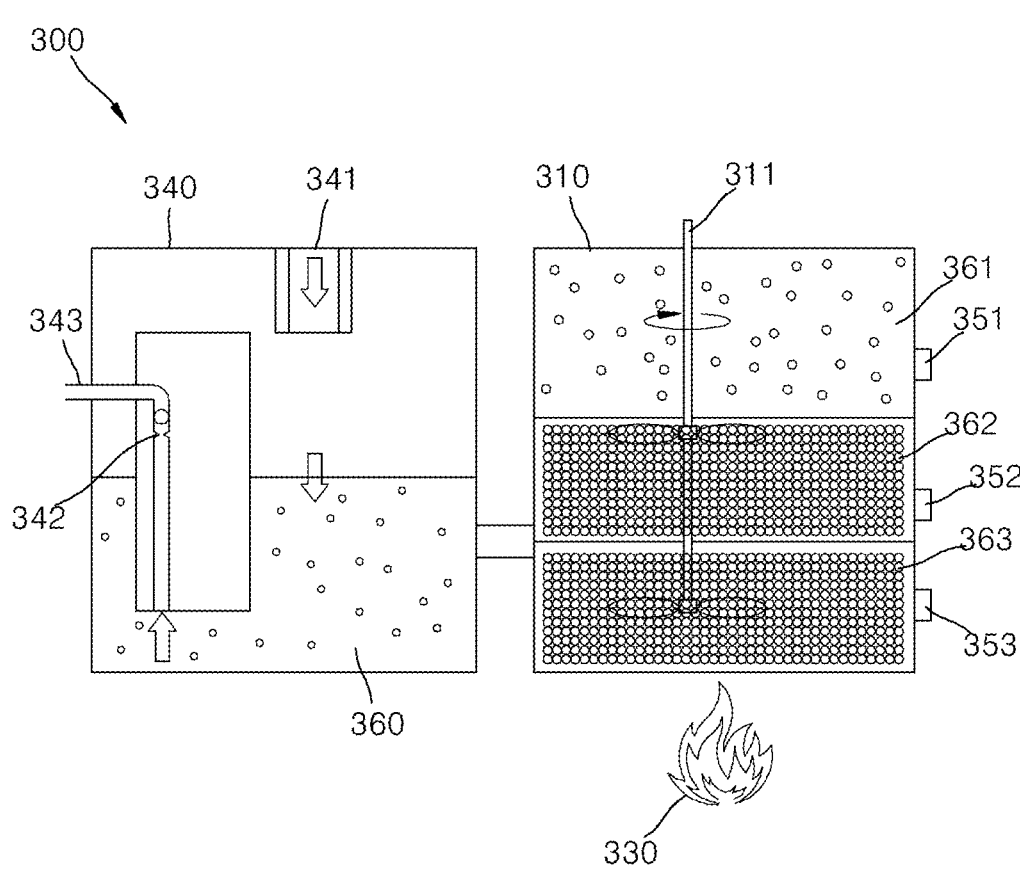

LASER INDUCED BREAKDOWN SPECTROSCOPE ANALYZING AEROSOL

CROSS-REFERENCE TO RELATED APPLICATIONS

This non-provisional application claims the benefit under 35 U.S.C. § 119 (a) to Patent Application Nos. 10-2023-0046104 and 10-2023-0046105, both filed in the Republic of Korea on Apr. 7, 2023, all of which are hereby expressly incorporated by reference into the present application.

TECHNICAL FIELD

The present invention relates to laser induced breakdown spectroscopy, and particularly, to technology of analyzing components of aerosol.

BACKGROUND ART

Laser induced breakdown spectroscopy (LIBS) is one of analysis technologies used for determining an element configuration of a sample. Plasma of a sample object is generated by using a high-energy laser pulse, and analyzed by using spectroscopy. An analysis process starts with a partial object is vaporized to form plasma by concentrating a high-energy laser beam on a sample surface. The plasma emits light in various wavelengths, and can be captured and analyzed by using a spectrometer. Since each element of a sample emits light in a unique wavelength set, a configuration of the sample can be determined by identifying a specific spectroscopic ray emitted by each element. The LIBS has various advantages compared to other element analysis technologies. Since the LIBS can analyze the sample without transformation or breaking, the LIBS is non-destructive. Further, since a result is output relatively quickly, the result can be generally obtained within several seconds to several minutes. Further, the LIBS can be used for analyzing samples in various states including solid, liquid, and gas. The LIBS can be variously utilized in fields such as environmental analysis, material science, industrial process control, etc. In particular, the LIBS is suitable for a case where it is difficult to prepare or carry the sample, and only a small quantity of objects are required, and it is not necessary to prepare a large sample, so the LIBS is very useful.

A main configuration of the LIBS is as follows. The LIBS generates the plasma from the sample by using a high-power laser. Laser energy is concentrated on the sample, and the object is removed and gasified. Laser induced plasma includes ions and atoms generated from the sample. The ions and atoms emit characteristic light when returning to a ground state. The element configuration of the sample can be determined by analyzing the light. The LIBS collects and analyzes the light emitted from the plasma by using the spectrometer. The light is diffused into component wavelengths, and an intensity of each wavelength is measured. The LIBS measures the intensity of the light emitted from the plasma in each wavelength by using a detector. The detector is generally constituted by a CCD camera or a photo multiplier tube. The LIBS makes the intensity of the emitted light and an element concentration of the sample by using a correction curve. The correction curve is configured by analyzing a sample of a known configuration under the same experimental condition as a sample to be analyzed. The sample to be analyzed should be appropriately prepared for accurate and precise measurement. To this end, the uniformity of the sample should be maintained by sample polishing or grinding, use of a sample holder or a matrix, etc.

The LIBS has the following characteristics. Since the LIBS can analyze the sample quickly within several seconds, the LIBS is useful for mass analysis. In addition, since the LIBS is non-destructive analysis technology which does not destruct the sample, the LIBS is important particularly when analyzing a sample which is valuable or cannot be replaced. Since the LIBS is a technology having high sensitivity, which can detect a very small quantity of elements in the sample, the LIBS can be usefully utilized in various fields such as environment monitoring, industrial process control, forensic analysis, etc. The LIBS is technology that can analyze various materials such as metal, mineral, ceramics, polymer, and biological tissue. The LIBS requires minimal sample preparation, which can save time and reduce a risk of sample contamination. An LIBS system can be designed considering portability, and is useful for field analysis or field measurement. The LIBS can detect various elements by one analysis, and quantitatively analyze the elements. The LIBS can quantitatively analyze the element configuration of the sample, so the LIBS can be usefully utilized in various fields, such as quality management and process optimization.

The LIBS can include a laser cavity, a pump source, a Q-switch, an optical device, and a control electronic device in order to generate a laser beam. The laser cavity is a core component that generates a laser beam, and can include two mirrors, an active medium (gas or crystal), and a power source supplying energy to the active medium. The pump source is a component that provides energy to the active medium of the laser cavity, and can be a flash lamp, a diode laser, or other lasers which emits light in a specific wavelength corresponding to an absorption spectrum of the active medium. The Q-switch as a device that controls a timing of a laser pulse converts a cavity into two states quickly to generate a high-energy pulse. The optical device as a continuum of a lens and a mirror is used to form the laser beam and bring a focus. The optical device assists controlling the duration and energy of the laser pulse. The control electronic device regulates a power source and a timing of the laser pulse to ensure the laser to generate a stable and consistent result.

The optical device can include a focusing optic, an emission collection optical device, a spectrometer, and a detector. The focusing optic is used for focusing the laser beam on the sample. The optical device can include the lens, the mirror, or a combination thereof in order to achieve a desired spot size. The emission collection optical device is used to collect light emitted from the plasma, and includes the lens and the mirror to concentrate and guide the light onto the spectrometer. The spectrometer is used to analyze the light emitted from the plasma, and diffuses the light into component wavelengths and measures an intensity of each wavelength. The detector can be used to measure the intensity of the light emitted by the plasma in each wavelength, and the detector can be a CCD camera or a photomultiplier tube.

FIG. 1 is a diagram illustrating an operating principle of a laser induced breakdown spectrometer.

A pulse laser beam irradiated by a pulse laser 710 is provided to a focusing lens 730 through a mirror 720. The focusing lens 730 may be placed to focus on the surface of a sample 800 to be analyzed. The pulse laser passing through the focusing lens 730 can generate plasma 810 of the sample 800. Light of various wavelengths emitted from the plasma 810 can be spectralized by passing through a collection lens

740, a light collector 750, and a spectrometer 760. Lights of spectralized wavelengths can be detected by a detector 770. In this specification, the pulse laser 710 can be referred to as a laser generator 710.

LIBS can be used for crude oil analysis. Crude oil is a complex compound of hydrocarbon with different compositions according to an oil supply source. Crude oil component analysis is important in various application fields including petroleum exploration, refinement, and environmental monitoring. According to related art for crude oil analysis, since the crude oil should be separated for each component, there is a problem in that a lot of time and cost can be consumed.

Further, the LIBS can also be used for analyzing oil of another type in addition to the crude oil, a powder type material such as fine dust, and materials such as radiation elements resolved in a coolant of a nuclear power plant.

SUMMARY OF THE INVENTION

The present invention has been made in an effort to provide a spectroscope which can detect a component an analysis target material in a state of not separating the analysis target material for each component.

Further, the present invention has been made in an effort to provide technology of generating aerosol in which the analysis target material and water are mixed, and analyzing the generated aerosol using LIBS. Further, the present invention has been made in an effort to provide technology that may solve a problem in that moisture included in the aerosol is condensed on a partial surface of a LIBS module, so an error occurs in an analysis result.

The present invention has been made in an effort to provide technology of analyzing aerosol generated by mixing an analysis target material and water using a LIBS. Since the LIBS may also measure an extreme small quantity of elements, the analysis target material may be analyzed by using the aerosol.

According to an aspect of the present invention, an analysis target material may be first converted into an aerosol type in order to analyze a component of the analysis target material. Aerosol is a dispersion of small solid or liquid particles in gas. The particles may be natural particles such as dust or pollen, or artificial particles such as smoke or smog. In addition, the particles may also be generated by a chemical reaction between gases at gas atmospheric pressure.

In the present invention, the analysis target material may be a material other than water and a material including some water. For example, the analysis target material may be crude oil, other type of oil other than the crude oil, power type material such as fine dust, and a radiation element resolved in a coolant of a nuclear power plant, and is not limited thereto.

According to an aspect of the present invention, a method for analyzing a component of an analysis target material by converting the analysis target material into aerosol may be provided. The method includes a process of converting the analysis target material into the aerosol in order to generate a drop cloud of a small analysis target material which may be easily analyzed. Various method such as ultrasonic spray, pneumatic spray, and electrostatic spray may be used in order to convert the analysis target material into the aerosol, and the present invention is not completely limited to a specific technical configuration for conversion into the aerosol.

When the analysis target material is converted into the aerosol, the analysis target material may be analyzed by using various analysis technologies such as LIBS, XRF, a mass analysis method, gas chromatography, and infrared spectroscopy. In respect to an analysis result, data may be used for determining a configuration and individual components of the analysis target material.

According to an aspect of the present invention, a mixing device mixing an analysis target material, water, and air, a heating device, and an aerosol conversion device for converting the mixture into aerosol may be provided. The aerosol conversion device includes a mixing device chamber including an analysis target material sample inlet, an air inlet, and a water inlet, a mixing machine, and an aerosol conversion device.

In this case, the water mixed with the analysis target material may be, for example, water having a purity of 99% or more.

For example, when the analysis target material is oil, a high-pressure or high-temperature environment is required to generate the aerosol while only the oil and the air are mixed, but when the oil, the air, and the water are mixed jointly, only a low-pressure or low-temperature environment relatively lower than the high pressure or high temperature may be provided to generate the aerosol.

According to an aspect of the present invention, gas may be analyzed using laser induced plasma breakdown spectroscopy (LIBS). To this end, a chemical configuration of compressed and injected aerosol may be analyzed by mounting a LIBS system on a pipe having a predetermined diameter (e.g., 1 inch), and concentrating light emitted from plasma generated by burning a small amount of mass of an aerosol sample which moves in the pipe on a surface of a sample by using a pulse laser beam focused on a sample at a center of the pipe.

In this case, the outside of the pipe is wound with a heating wire may be installed at a first location and a second location of the pipe. When the heating wire and a pipe therearound are heated by making electricity flow on the heating wire, condensation of a portion close to the heating wire on an inner surface of the pipe may be prevented. The first location may be a location spaced apart from a coupling region of a LIBS module and the pipe by a predetermined first distance in an extension direction of the pipe. The second location may be a location spaced apart from a coupling region of the LIBS module and the pipe by a predetermined second distance in an extension direction opposite to the extension direction of the pipe. The first distance and the second distance may have the same size.

An exemplary embodiment of the present invention may provide a LIBS module 100 including: a cover 1100 having a first optical channel 401 through which a laser beam passes and a second optical channel 402 through which plasma emission light passes therein; a first optical system placed in the first optical channel; and a second optical system placed in the second optical channel. A clamp 170 with a coupling hole 160 through which a predetermined pipe 200 may pass is formed in the cover, and the coupling hole is placed in a region where an extension path 1401 of the first optical channel and an extension path 1402 of the second optical channel cross.

In this case, the first optical system may include a first window member 181 placed on one end of the first optical channel, the second optical system may include a second window member 182 placed on one end of the second optical channel, and while the first segment 210 of the pipe is coupled to the coupling hole, the first window member may be placed at a location aligned with a first opening 211 formed in the first segment. In addition, while the first segment of the pipe is coupled to the coupling hole, the second window member may be placed at a location aligned with a second opening 212 formed in the first segment.

In this case, the first window member may block gas present inside the pipe not to flow into the first optical channel, and the second window member may block the gas present inside the pipe not to flow into the second optical channel, and the first window member may be made of a material through which the laser beam passes, and the second window member may be made of a material through which the plasma emission light passes.

In this case, the first optical system may include a first window member 181, a first lens 141, a first collimator 151, and a first cable holder 121 placed in sequence in an extension direction of the first optical channel. In addition, the second optical system may include a second window member 182, a second lens 142, a second collimator 152, and a second cable holder 122 placed in sequence in an extension direction of the second optical channel.

In this case, the first window member and the first cable holder may be placed on one end and the other end of the first optical channel, respectively, and the second window member and the second cable holder may be placed on one end and the other end of the second optical channel, respectively, and the first cable holder may be coupled to a first cable 131 supplying the laser beam, and the second cable holder may be coupled to a second cable 132 supplying the laser beam.

In this case, a focal region of the laser beam may be formed inside the pipe by the first optical system.

In this case, the clamp includes a first clamp branch 71 and a second clamp branch 72, and while a first segment 210 of the pipe is coupled to the coupling hole, the first clamp branch and the second clamp branch are tightened to each other to couple the pipe and the LIBS module to each other.

Another exemplary embodiment of the present invention may provide a LIBS device 10 including a LIBS module 100; and a pipe 200. The LIBS module includes: a cover 1100 having a first optical channel 401 through which a laser beam passes and a second optical channel 402 through which plasma emission light passes therein; a first optical system placed in the first optical channel; and a second optical system placed in the second optical channel. A clamp 170 with a coupling hole 160 through which the pipe 200 may pass is formed in the cover, and the coupling hole is placed in a region where an extension path 1401 of the first optical channel and an extension path 1402 of the second optical channel cross, and the pipe is coupled to the LIBS module by penetrating the coupling hole.

In this case, a first opening 211 and a second opening 212 may be formed in a first segment 210 of the pipe, the first optical system may include a first window member 181 placed one end of the first optical channel, and the second optical system may include a second window member 182 placed on one end of the second optical channel. In addition, while the first segment of the pipe is coupled to the coupling hole, the first window member may be placed at a location aligned with the first opening. In addition, while the first segment of the pipe is coupled to the coupling hole, the second window member may be placed at a location aligned with the second opening.

Yet another exemplary embodiment of the present invention may provide a spectroscope 1 including: a LIBS module 100; a pipe 200; an aerosol supplier 300; a laser generator 710; and a detector 770. The LIBS module includes: a cover 1100 having a first optical channel 401 through which a laser beam passes and a second optical channel 402 through which plasma emission light passes therein; a first optical system placed in the first optical channel; and a second optical system placed in the second optical channel. In this case, a clamp 170 with a coupling hole 160 through which the pipe 200 may pass is formed in the cover, and the coupling hole is placed in a region where an extension path 1401 of the first optical channel and an extension path 1402 of the second optical channel cross, the pipe is coupled to the LIBS module by penetrating the coupling hole, the aerosol supplier is configured to supply aerosol to an internal space of the pipe, the laser generator is configured to generate the laser beam, and the detector is configured to detect plasma emission light detected by the second optical system.

In this case, a first opening 211 and a second opening 212 may be formed in the pipe, the aerosol supplier may be configured to generate aerosol of a mixture including water and an analysis target material, and supply the generated aerosol to the pipe, and the LIBS module may be coupled to the pipe so that the first opening is placed on an extension path 1401 of the first optical channel and the second opening placed on an extension path 1402 of the second optical channel.

In this case, the LIBS module may include a first window member 181 placed in the first optical channel and a second window member 182 placed in the second optical channel. In addition, one end adjacent to the first opening of both ends of the first optical channel may be blocked by the first window member 181, and one end adjacent to the second opening of both ends of the second optical channel may be blocked by the second window member 182, so that the aerosol which moves through the pipe does not flow out to the inside of the LIBS module through the first opening and the second opening.

In this case, the laser generator 710 may be configured to generate the laser beam, and the detector 770 may be configured to detect the plasma emission light collected through the second optical channel.

In this case, a coupling portion between the pipe and the LIBS module may be sealed to prevent the aerosol which moves through the pipe from flowing out of the pipe through the first opening and the second opening.

In this case, a first heating wire 501 may be installed in the pipe, and the aerosol which moves through the pipe may be heated by heat provided by the first heating wire.

In the present invention, in order to convert a mixture of an analysis target material and water into the aerosol, first, air, an analysis target material sample, and water are put into a mixing device chamber through an air inlet, an analysis target material sample inlet, and a water inlet.

In addition, the mixture of the analysis target material sample and the water may be heated at a sufficient temperature (e.g., 30 to 400 degrees) so that the analysis target material sample and the water may be well mixed by using the heating device. The heating device may be any appropriate device which may generate heat, such as a furnace or a heat exchanger.

The mixing device may rotate and mix the mixture of the water and the analysis target material sample by using a mixer propeller which rotates at a sufficiently large RPM to mix the analysis target material sample, the water, and the air simultaneously with heating.

The analysis target material sample mixed with the water and the air flows into an aerosol conversion device to be converted into the aerosol.

The aerosol conversion device may be an appropriate device including a pneumatic spray mode, an ultrasonic spray mode, and an electrostatic spray mode.

According to an aspect of the present invention, gas may be analyzed using laser induced plasma breakdown spectroscopy (LIBS). To this end, a chemical configuration of compressed and injected aerosol may be analyzed by mounting a LIBS system on a pipe having a predetermined diameter (e.g., 1 inch), and concentrating light emitted from plasma generated by burning a small amount of mass of an aerosol sample which moves in the pipe on a surface of a sample by using a pulse laser beam focused on a sample at a center of the pipe.

In this case, the outside of the pipe is wound with a heating wire may be installed at a first location and a second location of the pipe. When the heating wire and a pipe therearound are heated by making electricity flow on the heating wire, condensation of a portion close to the heating wire on an inner surface of the pipe may be prevented. The first location may be a location spaced apart from a coupling region of a LIBS module and the pipe by a predetermined first distance in an extension direction of the pipe. The second location may be a location spaced apart from a coupling region of the LIBS module and the pipe by a predetermined second distance in an extension direction opposite to the extension direction of the pipe. The first distance and the second distance may have the same size.

An exemplary embodiment of the present invention may provide a spectroscope including: a pipe 200 having a first opening 211 and a second opening 212; an aerosol supplier 300 generating aerosol of a mixture including water and an analysis target material, and supplying the generated aerosol to the pipe; and a LIBS module 100 having a first optical channel 401 through which a laser beam passes and a second optical channel 402 collecting plasma emission light. In this case, the LIBS module is coupled to the pipe so that the first opening is placed on an extension path 1401 of the first optical channel and the second opening placed on an extension path 1402 of the second optical channel.

In this case, a coupling portion between the pipe and the LIBS module may be sealed to prevent the aerosol which moves through the pipe from flowing out of the pipe through the first opening and the second opening.

In this case, the LIBS module may include a first window member 181 placed in the first optical channel and a second window member 182 placed in the second optical channel. In addition, one end adjacent to the first opening of both ends of the first optical channel may be blocked by the first window member 181, and one end adjacent to the second opening of both ends of the second optical channel may be blocked by the second window member 182, so that the aerosol which moves through the pipe does not flow out to the inside of the LIBS module through the first opening and the second opening.

In this case, a first heating wire 501 may be installed in the pipe, and the aerosol which moves through the pipe may be heated by heat provided by the first heating wire.

In this case, the LIBS module may further include a laser generator 710 configured to generate the laser beam, and a detector 770 configured to detect the plasma emission light collected through the second optical channel.

In this case, the LIBS module may include a cover 1100; a first optical system placed in the first optical channel, and a second optical system placed in the second optical channel. In addition, the first optical channel and the second optical channel may be formed inside the cover, and a clamp 170 forming a coupling hole 160 through which the pipe may pass may be formed in the cover, and the coupling hole may be placed in a region where an extension path of the first optical channel and an extension path of the second optical channel cross.

In this case, the first optical system may include a first window member 181 placed on one end of the first optical channel, the second optical system may include a second window member 182 placed on one end of the second optical channel, and the first opening and the second opening may be formed in a first segment 210 which is a part of the pipe, which is coupled to the LIBS module. In addition, while the first segment of the pipe is coupled to the coupling hole, the first window member may be placed at a location aligned with the first opening. In addition, while the first segment of the pipe is coupled to the coupling hole, the second window member may be placed at a location aligned with the second opening.

In this case, the first window member may block gas present inside the pipe not to flow into the first optical channel, and the second window member may block the gas present inside the pipe not to flow into the second optical channel, and the first window member may be made of a material through which the laser beam passes, and the second window member may be made of a material through which the plasma emission light passes.

In this case, the first optical system may include a first window member 181, a first lens 141, a first collimator 151, and a first cable holder 121 placed in sequence in an extension direction of the first optical channel. In addition, the second optical system may include a second window member 182, a second lens 142, a second collimator 152, and a second cable holder 122 placed in sequence in an extension direction of the second optical channel.

In this case, the first window member and the first cable holder may be placed on one end and the other end of the first optical channel, respectively, and the second window member and the second cable holder may be placed on one end and the other end of the second optical channel, respectively, and the first cable holder may be coupled to a first cable 131 supplying the laser beam, and the second cable holder may be coupled to a second cable 132 supplying the laser beam.

In this case, a focal region of the laser beam may be formed inside the pipe by the first optical system.

In this case, the clamp includes a first clamp branch 71 and a second clamp branch 72, and while a first segment 210 of the pipe is coupled to the coupling hole, the first clamp branch and the second clamp branch are tightened to each other to couple the pipe and the LIBS module to each other.

According to an exemplary embodiment of the present invention, an analysis target material need not be separated for each component for LIBS analysis of the analysis target material.

Further, according to an exemplary embodiment of the present invention, technology of generating aerosol in which the analysis target material and water are mixed, and analyzing the generated aerosol using LIBS can be provided. Further, according to an exemplary embodiment of the present invention, technology that may solve a problem in that moisture included in the aerosol is condensed on a partial surface of a LIBS module, which may incur an error in an analysis result can be provided.

BRIEF DESCRIPTION OF THE DRAWINGS

FIG. 1 is a diagram illustrating an operating principle of a laser induced breakdown spectrometer.

FIG. 2 is a diagram illustrating a configuration of a spectroscope provided according to an exemplary embodiment of the present invention.

FIG. 3 illustrates exteriors of a LIBS module and a pipe illustrated in FIG. 2, and a coupling relationship thereof.

FIG. 4A illustrates a coupling relationship of a first cover and a second cover constituting an enclosure of a main body of the LIBS module provided according to an exemplary embodiment of the present invention.

FIG. 4B illustrates a profile of an inner surface of the second cover constituting the main body of the LIBS module provided according to an exemplary embodiment of the present invention.

FIG. 4C illustrates a structure of the pipe provided according to an exemplary embodiment of the present invention.

FIG. 5 illustrates a configuration of an input optical system passing through a first optical channel formed in the LIBS module and a configuration of an output optical system passing through a second optical channel formed in the LIBS module provided according to an exemplary embodiment of the present invention.

FIG. 6 illustrates an optical connection relationship between an internal space of the pipe and the LIBS module provided according to an exemplary embodiment of the present invention.

FIG. 7 illustrates a configuration example of an aerosol supplier provided according to an exemplary embodiment of the present invention.

DETAILED DESCRIPTION OF THE EMBODIMENTS

Hereinafter, exemplary embodiments of the present invention will be described with reference to the accompanying drawings. However, the present invention is not limited to the exemplary embodiments described herein and can be implemented in several different forms. Terms used in this specification are used to help understanding the exemplary embodiments, and are not intended to limit the scope of the present invention. Further, the singular forms used below include plural forms as well, if the phrases do not clearly have the opposite meaning.

FIG. 2 is a diagram illustrating a configuration of a spectroscope provided according to an exemplary embodiment of the present invention.

The spectroscope 1 may include a LIBS module 100 and a pipe 200. The spectroscope 1 may further additional components such as a pulse laser 710, a mirror 720, a light collector 750, a spectrometer 760, and a detector 770, and the additional components may be changed according to a specific exemplary embodiment. The spectroscope 1 may also be referred to as an optical spectroscope 1. In this specification, the LIBS module may also be a LIBS device or a laser induced breakdown spectroscope. In this specification, the pulse laser 710 may be referred to as a laser generator 710.

The pipe 200 is used as a movement passage of aerosol supplied by an aerosol supplier 240. The pipe 200 is coupled to the LIBS module 100 according to a predetermined structure described below.

FIG. 3 illustrates exteriors of a LIBS module 100 and a pipe 200 illustrated in FIG. 2, and a coupling relationship thereof.

FIG. 4A illustrates a coupling relationship of a first cover 1110 and a second cover 1120 constituting an enclosure of a main body 110 of the LIBS module 100.

FIG. 4B illustrates a profile of an inner surface of the second cover 1120 constituting the main body 110 of the LIBS module 100.

FIG. 4C illustrates a structure of the pipe 200.

The enclosure formed by the first cover 1110 and the second cover 1120 may be referred to as a cover 1100 in this specification. The number of pieces constituting the cover 1100 and a method for manufacturing the cover 1100 may vary depending on an exemplary embodiment, and the present invention is not limited thereto.

Hereinafter, the present invention will be described jointly with reference to FIGS. 3, 4A, 4B, and 4C jointly.

Predetermined aerosol supplied by the aerosol supplier 300 may move through an inside of the pipe 200. In an exemplary embodiment, the aerosol supplier 300 may be configured to convert an analysis target material into the aerosol, and supply the aerosol to the inside of the pipe.

The LIBS module 100 may be configured to cover a first segment 210 of the pipe 200. In this specification, the first segment 210 may also be referred to as a coupling segment.

A first heating wire 501 may be installed at a first point of the pipe 200. A second heating wire 502 may be installed at a second point of the pipe 200. When moisture is included in the aerosol which moves through the pipe 200, the moisture may be condensed and formed on an inner surface of the pipe 200. In this case, when a location where the moisture is formed is present on a path of a laser beam provided by the LIBS module 100, accurate analysis may not be made. Accordingly, the first heating wire 501 and the second heating wire 502 serves to prevent the moisture from being condensed and formed around the LIBS module 100 by heating the aerosol and the moisture therein to be warm immediately before the aerosol including the moisture reaches the path of the laser beam provided by the LIBS module 100.

Referring to FIG. 4A, the enclosure of the LIBS module 100 may be provided by coupling the first cover 1110 and the second cover 1120. In an exemplary embodiment, the first cover 1110 and the second cover 1120 may have a shape in which both covers are symmetric to each other. Accordingly, when a structure of the second cover 1120 is described, a structure of the first cover 1110 may also be appreciated in the same scheme as the structure of the second cover 1120.

Inside the cover 1100 which is the enclosure formed by coupling the first cover 1110 and the second cover 1120, a first optical channel 401 through which a laser beam provided by a first cable 131 passes and a second optical channel 402 through which plasma emission light collected by the LIBS module 100 passes may be formed. In an exemplary embodiment, the laser beam may be a pulse type laser. The plasma emission light may be generated when the aerosol present in an internal space of the pipe 200 obtains energy by the laser beam provided by the LIBS module 100.

In an exemplary embodiment, the first optical channel 401 may be provided in such a manner that a plurality of empty spaces having shapes of cylinders with different heights and diameters are placed in sequence in an extension direction of the first optical channel. Empty spaces having the cylinder shapes may be placed coaxially. The second optical channel 402 may be provided in such a manner that a plurality of empty spaces having shapes of cylinders with different heights and diameters are placed in sequence in an extension direction of the second optical channel. Empty spaces having the cylinder shapes may be placed coaxially.

In a region where the first optical channel 410 and the second optical channel 402 cross each other, a first coupling hole 161 through which the pipe 200 passes, a second coupling hole 162 through which the pipe 200 passes, a first clamp 171, and a second clamp 172 may be placed. In this specification, the first clamp 171 and the second clamp 172 may be integrally referred to as a clamp 170, and the first coupling hole 161 and the second coupling hole 162 may be integrally referred to as a coupling hole 160.

The first coupling hole 161 is formed in the first cover 1110, and the second coupling hole 162 is formed in the second cover 1120. Shapes of cross-sections of the first coupling hole 161 and the second coupling hole 162 may be a shape corresponding to a shape of a cross-section of the pipe 200.

A shape of the first coupling hole 161 is defined by the first clamp 171 formed in the first cover 1110, and a shape of the second coupling hole 162 is defined by the second clamp 172 formed in the second cover 1120.

Referring to FIG. 4B, the second clamp 172 may include a first clamp branch 71 and a second clamp branch 72.

Since the first cover 1110 has a structure symmetric to the second cover 1120, the first clamp 171 may also include the first clamp branch 71 and the second clamp branch 72.

In an exemplary embodiment, a first screw hole may be formed in the first clamp branch 71, and a second screw hole may be formed in the second clamp branch 72. The first screw hole and the second screw hole may be placed in an aligned state with each other. The pipe 200 passes through the first coupling hole 161 and the second coupling hole 162 to align the coupling segment 210 of the pipe 200 and the main body 110 of the LIBS module 100 with each other. When the first screw hole and the second screw hole are coupled and tightened to each other with a bolt 90 in a state in which the coupling segment 210 is aligned with the main body 110 of the LIBS module 100, the first clamp branch 71 and the second clamp branch 72 strongly tighten the pipe 200, and as a result, the pipe 200 maintains a state in which the pipe 200 is coupled to the LIBS module 100 without moving with respect to the LIBS module 100.

Referring to FIG. 4C, a first opening 211 and a second opening 212 may be formed in the coupling segment 210 of the pipe 200. The clamp 170 of the LIBS module 100 may be coupled to the pipe 200 in the coupling segment 210.

The first heating wire 501 may be installed at the first point of the pipe 200 spaced apart from the coupling segment 210, and the second heating wire 502 may be installed at the second point of the pipe 200 spaced apart from the coupling segment 210. The first point may be present in a direction in which the aerosol flows into the coupling segment 210, and the second point may be present in a direction in which the aerosol flows out of the coupling segment 210. The first heating wire 501 and the second heating wire 502 may be wound and coupled onto an outer surface of the pipe 200, but a coupling form is not limited to the state illustrated in FIG. 4C.

In order to prevent the moisture included in the aerosol which flows into the pipe 200 from being condensed on the surface of the LIBS module 100 adjacent to an internal space of the coupling segment 210, a control device 600 included in the spectroscope 1 heats the first heating wire 501 placed at a left side of the coupling segment 210 when the aerosol flows into the pipe 200 from a left end of FIG. 4C and the control device 600 included in the spectroscope 1 heat the second heating wire 502 placed at a right side of the coupling segment 210 when the aerosol flows into the pipe 200 from a right end of FIG. 4C.

FIG. 5 illustrates a configuration of an input optical system passing through a first optical channel 401 formed in the LIBS module 100 and a configuration of an output optical system passing through a second optical channel 402 formed in the LIBS module 100. In this specification, the input optical system may be referred to as a first optical system, and the output optical system may be referred to as a second optical system.

The input optical system may include a first cable 131, a first cable holder 121, a first collimator 151, a focusing lens 141, and a first window member 181 placed in sequence. The focusing lens 141 may also be referred to a first lens 141 in this specification.

A part of the first cable holder 121 may be coupled to the second cover 1120, and the other one part may be coupled to the first cable 131. The focusing lens 141 may be configured to allow a focus of a laser beam provided from the first cable 131 to be brought on an aerosol sample formed inside the pipe 200. The first window member 181 is made of a transparent or translucent material for passing the laser beam, and provides a function of optically connecting the first optical channel 401 and the inside of the pipe 200 and a function of separating the first optical channel 401 from external gas of the LIBS module 100. The first cable holder 121 provides a function of optically connecting the first cable 131 to the first optical channel 401 and a function of sealing the first optical channel 401 from the outside of the LIBS module 100.

The output optical system may include a second cable 132, a second cable holder 122, a second collimator 152, a plasma emission light collection lens 142, and a second window member 182 placed in sequence. In this specification, the plasma emission light collection lens 142 may also be referred to as a second lens 142.

A part of the second cable holder 122 may be coupled to the second cover 1120, and the other one part may be coupled to the second cable 132. The plasma emission light collection lens 142 provides a function of collecting the plasma emission light generated inside the pipe 200, and providing the collected plasma emission light to the second collimator 152 and the second cable 132. The second window member 182, which is made of the transparent or translucent material, provides a function of optically connecting the second optical channel 402 and the inside of the pipe 200 and a function of separating the second optical channel 402 from the external gas of the LIBS module 100. The second cable holder 122 provides a function of optically connecting the second cable 132 to the second optical channel 402 and a function of sealing the second optical channel 402 from the outside of the LIBS module 100.

FIG. 6 illustrates an optical connection relationship between an internal space of the pipe 200 and the LIBS module 100.

In FIG. 6, only the pipe 200, the focusing lens 141, the plasma emission light collection lens 142, the first window member 181, and the second window member 182 are illustrated. FIG. 6 illustrates cross-sections at x=0 illustrated in FIGS. 4A and 4C. A laser beam sequentially passing through the focusing lens 141 and the first window member 181 may enter the inside of the pipe 200 through the first opening 211. To this end, the first window member 181 and the first opening 211 are aligned with each other.

The plasma emission light generated in the pipe 200 reaches the plasma emission light collection lens 142 by sequentially passing through the second opening 212 and the second window member 182. To this end, the second window member 182 and the second opening 212 are aligned with each other.

The LIBS module 100 provided according to an exemplary embodiment of the present invention may include the first cover 1110, the second cover 1120, the first cable holder 121, the second cable holder 122, the first collimator 151, the second collimator 152, the focusing lens 141, the plasma emission light collection lens 142, the first window member 181, and the second window member 182. The LIBS module 100 may further include the first cable 131 and the second cable 132.

The LIBS device 10 provided according to an exemplary embodiment of the present invention may include the LIBS module 100 and the pipe 200. The LIBS device 10 may further include the first heating wire 501 and the second heating wire 502.

The spectroscope 1 provided according to an exemplary embodiment of the present invention may include the LIBS device 10, the pulse laser 710, the spectrometer 760, the detector 770, and an aerosol supply device 300. The spectroscope 1 may further include a control device 600. The control device 600 as a computing device having various interfaces may control an operation of the aerosol supplier 300, and operations of the first heating wire 501, the second heating wire 502, the pulse laser 710, and the detector 770.

In FIG. 2, the first optical system including reference numeral 720 may be replaced with an optical system including the first cable 131, and the second optical system including reference numeral 750 may be replaced with an optical system including the second cable 132.

FIG. 7 illustrates a configuration example of an aerosol supplier provided according to an exemplary embodiment of the present invention.

The aerosol supplier 300 may include a mixer 310, a heating device 300, and an aerosol conversion device 340.

The mixer 310 may include a mixing machine 311.

The mixer 310 may have an air inlet 351 supplying air to the mixer 310, an analysis target material inlet 352 supplying an analysis target material to the mixer 310, and a water inlet 353 supplying water to the mixer 310. Air 361, an analysis target material 362, and water 363 may be provided into the mixer 310 through the air inlet 351, the analysis target material inlet 352, and the water inlet 353.

The analysis target material may be a material other than water and a material including some water. For example, the analysis target material may be crude oil, other types of oil other than the crude oil, power type material such as fine dust, and a radiation element resolved in a coolant of a nuclear power plant, and is not limited thereto.

The heating device 300 may heat a mixture of the analysis target material 362 and the water 363 at a sufficient temperature (e.g., 30 to 400 degrees) so that the analysis target material 362 and the water 363 may be well mixed by the mixing machine 311 in the mixer 310. The heating device may be any appropriate device which may generate heat, such as a furnace or a heat exchanger.

A mixture 360 of the analysis target material in which the air 361, the analysis target material 362, and the water 363 are mixed may be supplied to the aerosol conversion device 340. The aerosol conversion device 340 may include a pressurized gas inlet 341, a pinhole 342, and an aerosol outlet 343.

When gas which flows in through the pressurized gas inlet 341 applies pressure to the mixture 360 of the analysis target material prepared in the aerosol conversion device 340, the mixture 360 of the analysis target material may be converted into aerosol while passing through the pinhole 342 by the pressure, and the converted aerosol may be jetted through the aerosol outlet 343.

The aerosol outlet 343 is connected to the pipe 200 to supply aerosol constituted by the analysis target material, the water, and the air to the inside of the pipe 200.

In a modified exemplary embodiment of the present invention, if the aerosol supplier has a configuration of modifying the mixture in which the water, the analysis target material, and the air are mixed into the aerosol, the aerosol supplier may be used for the present invention regardless of any configuration.

Various changes and modifications will be able to be easily executed without the scope without departing from fundamental characteristics of the present invention by those skilled in the art by using the exemplary embodiments of the present invention. Contents of each claim of the appended claims may be combined into other claims without a citation relationship within a scope which can be appreciated through this specification.

What is claimed is:

1. A laser induced breakdown spectroscopy (LIBS) module comprising:
   a cover having a first optical channel through which a laser beam passes and a second optical channel through which plasma emission light passes therein;
   a first optical system placed in the first optical channel; and
   a second optical system placed in the second optical channel,
   wherein a clamp with a coupling hole through which a pipe passes is formed in the cover,
   wherein the coupling hole is placed in a region where an extension path of the first optical channel and an extension path of the second optical channel cross,
   wherein the first optical system includes a first window member placed on one end of the first optical channel,
   wherein the second optical system includes a second window member placed on one end of the second optical channel,
   wherein, while a first segment of the pipe is coupled to the coupling hole, the first window member is placed at a location aligned with a first opening formed in the first segment, and
   wherein, while the first segment of the pipe is coupled to the coupling hole, the second window member is placed at a location aligned with a second opening formed in the first segment.

2. The LIBS module of claim 1, wherein the clamp includes a first clamp branch and a second clamp branch, and
   while the first segment of the pipe is coupled to the coupling hole, the first clamp branch and the second clamp branch are tightened to each other to couple the pipe and the LIBS module to each other.

3. The LIBS module of claim 1, wherein the first window member blocks gas present inside the pipe to not flow into the first optical channel,
   the second window member blocks the gas present inside the pipe not to not flow into the second optical channel,
   the first window member is made of a material through which the laser beam passes, and
   the second window member is made of a material through which the plasma emission light passes.

4. The LIBS module of claim 1, wherein the first optical system includes the first window member, a first lens, a first collimator, and a first cable holder placed in sequence in an extension direction of the first optical channel, and
   the second optical system includes the second window member, a second lens, a second collimator, and a second cable holder placed in sequence in an extension direction of the second optical channel.

5. The LIBS module of claim 4, wherein the first cable holder is placed on another end of the first optical channel, the second cable holder is placed on another end of the second optical channel, the first cable holder is coupled to a first cable supplying the laser beam, and the second cable holder is coupled to a second cable supplying the plasma emission light.

6. A laser induced breakdown spectroscopy (LIBS) device comprising:

a LIBS module; and a pipe, wherein the LIBS module includes:

a cover having a first optical channel through which a laser beam passes and a second optical channel through which plasma emission light passes therein, a first optical system placed in the first optical channel, and a second optical system placed in the second optical channel, wherein a clamp with a coupling hole through which the pipe passes is formed in the cover, wherein the coupling hole is placed in a region where an extension path of the first optical channel and an extension path of the second optical channel cross, wherein the pipe is coupled to the LIBS module by penetrating the coupling hole, wherein a first opening and a second opening are formed in a first segment of the pipe, wherein the first optical system includes a first window member placed on one end of the first optical channel, wherein the second optical system includes a second window member placed on one end of the second optical channel, wherein, while the first segment of the pipe is coupled to the coupling hole, the first window member is placed at a location aligned with the first opening, and wherein, while the first segment of the pipe is coupled to the coupling hole, the second window member is placed at a location aligned with the second opening.

7. The LIBS device of claim 6, wherein the clamp includes a first clamp branch and a second clamp branch, and while the first segment of the pipe is coupled to the coupling hole, the first clamp branch and the second clamp branch are tightened to each other to couple the pipe and the LIBS module to each other.

8. A spectroscope comprising:

a laser induced breakdown spectroscopy (LIBS) module;

a pipe:

an aerosol supplier;

a laser generator; and a detector, wherein the LIES module includes:

a cover having a first optical channel through which a laser beam passes and a second optical channel through which plasma emission light passes therein, a first optical system placed in the first optical channel, and a second optical system placed in the second optical channel, wherein a clamp with a coupling hole through which the pipe passes is formed in the cover, wherein the coupling hole is placed in a region where an extension path of the first optical channel and an extension path of the second optical channel cross, wherein a first opening and a second opening are formed in the pipe, wherein the first optical system includes a first window member placed in the first optical channel, wherein the second optical system includes a second window member placed in the second optical channel, wherein the LIBS module is coupled to the pipe so that the first opening is placed on the extension path of the first optical channel and the second opening is placed on the extension path of the second optical channel, and wherein one end, adjacent to the first opening, of both ends of the first optical channel is blocked by the first window member, and one end, adjacent to the second opening, of both ends of the second optical channel is blocked by the second window member.

9. The spectroscope of claim 8, wherein the pipe is coupled to the LIBS module by penetrating the coupling hole, the aerosol supplier is configured to supply aerosol to an internal space of the pipe, the laser generator is configured to generate the laser beam, and the detector is configured to detect plasma emission light detected by the second optical system.

10. The spectroscope of claim 8, wherein the aerosol supplier is configured to generate an aerosol of a mixture including water and an analysis target material, and supply the generated aerosol to the pipe.

11. The spectroscope of claim 10, wherein the first window member blocks the end of the first optical channel adjacent to the first opening and the second window member blocks the end of the second optical channel adjacent to the second opening so that the aerosol which moves through the pipe does not flow to an inside of the LIBS module through the first opening and the second opening.

12. The spectroscope of claim 8, wherein the clamp includes a first clamp branch and a second clamp branch, and while a first segment of the pipe is coupled to the coupling hole, the first clamp branch and the second clamp branch are tightened to each other to couple the pipe and the LIBS module to each other.

* * * * *